(12) United States Patent
Xiong

(10) Patent No.: US 9,577,540 B1
(45) Date of Patent: Feb. 21, 2017

(54) MULTI-STAGE FLYBACK CONVERTER FOR WIDE INPUT VOLTAGE RANGE APPLICATIONS

(71) Applicant: Universal Lighting Technologies, Inc., Madison, AL (US)

(72) Inventor: Wei Xiong, Madison, AL (US)

(73) Assignee: UNIVERSAL LIGHTING TECHNOLOGIES, INC., Madison, AL (US)

( * ) Notice: Subject to any disclaimer, the term of this patent is extended or adjusted under 35 U.S.C. 154(b) by 50 days.

(21) Appl. No.: 14/168,553

(22) Filed: Jan. 30, 2014

Related U.S. Application Data

(60) Provisional application No. 61/759,594, filed on Feb. 1, 2013.

(51) Int. Cl.
  *H02M 3/335* (2006.01)
(52) U.S. Cl.
  CPC ....... *H02M 3/3353* (2013.01); *H02M 3/33507* (2013.01)
(58) Field of Classification Search
  USPC ....... 363/15, 16, 17, 20, 21.04, 21.12, 21.18
  See application file for complete search history.

(56) References Cited

U.S. PATENT DOCUMENTS

| | | | | |
|---|---|---|---|---|
| 5,684,683 | A | * | 11/1997 | Divan et al. .................... 363/65 |
| 6,069,798 | A | * | 5/2000 | Liu ................................. 363/16 |
| 2004/0145928 | A1 | * | 7/2004 | Takada ........................... 363/95 |
| 2004/0223351 | A1 | * | 11/2004 | Kurokami et al. ............. 363/65 |
| 2006/0050021 | A1 | * | 3/2006 | Choi ............................... 345/60 |
| 2011/0249474 | A1 | * | 10/2011 | Luo ........................... 363/21.12 |
| 2012/0051108 | A1 | * | 3/2012 | Leu et al. ..................... 363/126 |
| 2013/0039102 | A1 | * | 2/2013 | Lai ............................... 363/101 |

* cited by examiner

*Primary Examiner* — Jeffrey Gblende
(74) *Attorney, Agent, or Firm* — Patterson Intellectual Property Law, PC; Mark J. Patterson; Gary L. Montle

(57) ABSTRACT

A multi-stage flyback circuit is provided for a wide range of DC input voltage applications. An intermediate circuit is coupled across a DC source which may be for example an output from a diode bridge rectifier. A first flyback stage includes a primary winding of a flyback transformer and a first switch coupled in series between a midpoint of the intermediate circuit and a negative DC terminal. A second flyback stage includes a second primary winding and a second switch coupled in series between the midpoint of the intermediate circuit and a positive DC terminal. A secondary winding of the flyback transformer is coupled to a DC load. The first and second switches are operated synchronously, wherein the voltage stress on each of the first and second switches is substantially reduced.

7 Claims, 3 Drawing Sheets

_US 9,577,540 B1_

MULTI-STAGE FLYBACK CONVERTER FOR WIDE INPUT VOLTAGE RANGE APPLICATIONS

CROSS-REFERENCES TO RELATED APPLICATIONS

This application claims benefit of the following patent application which is hereby incorporated by reference: U.S. Provisional Patent Application No. 61/759,594, filed Feb. 1, 2013.

A portion of the invention of this patent document contains material that is subject to copyright protection. The copyright owner has no objection to the reproduction of the patent document or the patent invention, as it appears in the U.S. Patent and Trademark Office patent file or records, but otherwise reserves all copyright rights whatsoever.

BACKGROUND OF THE INVENTION

The present invention relates generally to switching power converters. More particularly, the present invention relates to DC-DC power converters configured with a plurality of stages for reducing voltage stress on circuit components and improving efficiency.

Flyback converter topologies are known in the art as low cost solutions for use in isolated power supplies. A flyback converter may provide power factor correction and isolated DC-DC power conversion at the same time. However, in applications having a wide range of potential input voltages, for example a 96V-312V input range, the voltage stress on components such as the main switch is sufficiently large that a switching component with a high voltage rating must be selected. This high voltage rating component, typically a MOSFET, is prohibitively expensive and can be difficult to obtain.

Referring to FIG. 1, one example of a conventional design for an offline flyback power converter 10 includes an input AC source V1 and a rectifier circuit including diodes D1-D4. An electromagnetic interference (EMI) filter may be provided with components L1, C1, L2 for reducing common-mode and differential-mode noise.

A main flyback transformer has a primary winding Tp and secondary winding Ts. A main switch Q1 is coupled in series with the primary winding Tp across positive and negative DC input terminals (i.e., as represented by V2 and GND_p, respectively). A control circuit CTL is used to drive the main switch Q1 to realize power factor correction and regulation of an output voltage V3.

The secondary winding Ts of the flyback transformer is coupled in series with an output rectifier D5 that converts energy from the secondary winding Ts to a DC voltage. An output capacitor C2 is coupled across the series circuit of Ts and D5 and supplies a load (R_load) for the particular application.

The voltage stress on the main switch Q1 when the switch Q1 is turned off is defined in accordance with equation (1):

$$V_{Q1} = \sqrt{2} \times V_{1\_rms} + N \times V_{out} + V_{leakage} \quad (1)$$

If the input voltage V1 has a wide range, i.e. 108V-302V, and as additional parameters the turns ratio N=4 (as may typically be the case for low output voltage), Vleakage=70V and Vout=55V, a maximum voltage VQ1 across the main switch will be 717V. Therefore, a switch (e.g., MOSFET) Q1 with an 800V rating will have to be chosen to meet the voltage requirements of the system.

However, high voltage MOSFETs, such as for example those having an 800V rating, are expensive and difficult to obtain. Further, a typical on-resistance for a high voltage MOSFET is relatively high in comparison with a low voltage MOSFET that has the same current rating.

Briefly stated, if a conventional flyback topology is used for wide range input power factor correction (PFC) and DC-to-DC conversion applications, it is typically going to be prohibitively expensive and inefficient.

BRIEF SUMMARY OF THE INVENTION

Various embodiments of a multi-stage topology according to the present invention may effectively solve the high voltage stress and inefficiency issues as previously noted with respect to conventional flyback power converters.

In an exemplary embodiment of a power converter according to the present invention, a multi-stage flyback circuit includes an intermediate circuit coupled across first and second DC input terminals and defining a midpoint. A first flyback converter stage is coupled in series between the midpoint of the intermediate circuit and the second DC input terminal. A second flyback converter stage is coupled in series between the midpoint of the intermediate circuit and the first DC input terminal.

In one further aspect, the intermediate circuit may be coupled across a DC source such as, for example, an output from a diode bridge rectifier, and may further include at least first and second capacitors coupled in series.

In another aspect, the first flyback stage includes an inductance such as a primary winding of a flyback transformer and a first switching element coupled in series between a midpoint of the intermediate circuit and a negative DC terminal. The second flyback stage includes a second primary winding and a second switching element coupled in series between a midpoint of the intermediate circuit and a positive DC terminal. A secondary winding of the flyback transformer is coupled to a DC load.

In another aspect, the first and second switches are operated synchronously, wherein the voltage stress on each of the first and second switches is substantially reduced.

In another aspect of the present invention, a voltage across the first capacitor is substantially equal to a voltage across the second capacitor, further wherein a voltage stress across the first and second switching elements is substantially equal.

In yet another aspect, the intermediate circuit may include a plurality (N) of capacitors coupled in series across the DC terminals and defining one or more (N−1) intermediate nodes. A respective plurality (N) of primary converter stages may each be coupled across one of the intermediate circuit capacitors and may further include a switching element coupled in series with a primary winding of a flyback transformer. A respective plurality (N) of secondary converter stages may further each be coupled in parallel across first and second output terminals and further include a respective secondary winding of the flyback transformer.

DETAILED DESCRIPTION OF THE INVENTION

Figure 1:
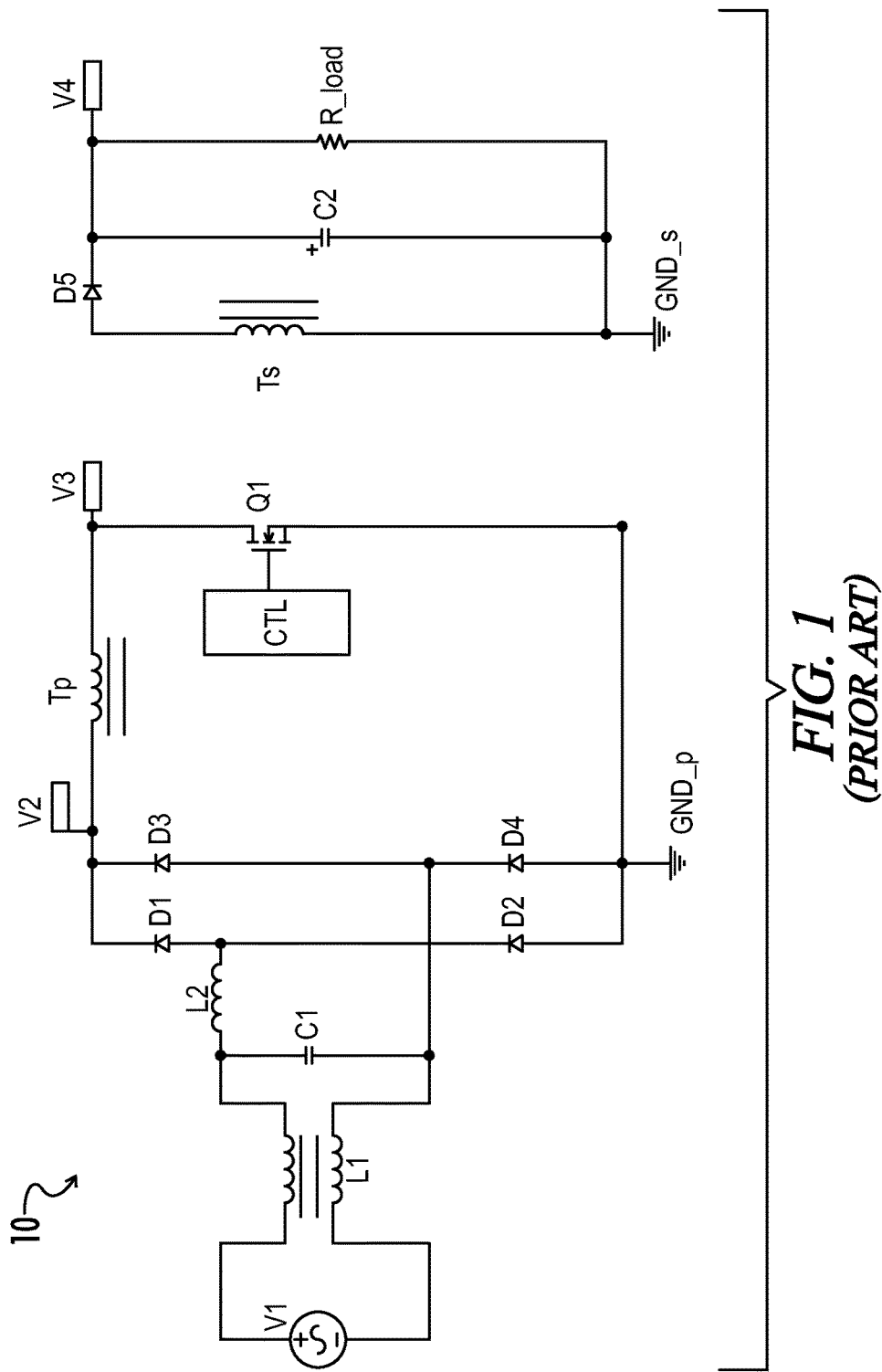
FIG. 1 is a circuit diagram representing an example of a flyback converter circuit as previously known in the art.

Throughout the specification and claims, the following terms take at least the meanings explicitly associated herein, unless the context dictates otherwise. The meanings identified below do not necessarily limit the terms, but merely provide illustrative examples for the terms.

The meaning of "a," "an," and "the" may include plural references, and the meaning of "in" may include "in" and "on." The phrase "in one embodiment," as used herein does not necessarily refer to the same embodiment, although it may. Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The term "coupled" means at least either a direct electrical connection between the connected items or an indirect connection through one or more passive or active intermediary devices.

The term "circuit" means at least either a single component or a multiplicity of components, either active and/or passive, that are coupled together to provide a desired function.

The terms "switching element" and "switch" may be used interchangeably and may refer herein to at least: a variety of transistors as known in the art (including but not limited to FET, BJT, IGBT, JFET, etc.), a switching diode, a silicon controlled rectifier (SCR), a diode for alternating current (DIAC), a triode for alternating current (TRIAC), a mechanical single pole/double pole switch (SPDT), or electrical, solid state or reed relays. Where either a field effect transistor (FET) or a bipolar junction transistor (BJT) may be employed as an embodiment of a transistor, the scope of the terms "gate," "drain," and "source" includes "base," "collector," and "emitter," respectively, and vice-versa.

The terms "power converter" and "converter" unless otherwise defined with respect to a particular element may be used interchangeably herein and with reference to at least DC-DC, DC-AC, AC-DC, buck, buck-boost, boost, half-bridge, full-bridge, H-bridge or various other forms of power conversion or inversion as known to one of skill in the art.

Terms such as "providing," "processing," "supplying," "determining," "calculating" or the like may refer at least to an action of a computer system, computer program, signal processor, logic or alternative analog or digital electronic device that may be transformative of signals represented as physical quantities, whether automatically or manually initiated.

The terms "controller," "control circuit" and "control circuitry" as used herein may refer to, be embodied by or otherwise included within a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed and programmed to perform or cause the performance of the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

Figure 2:
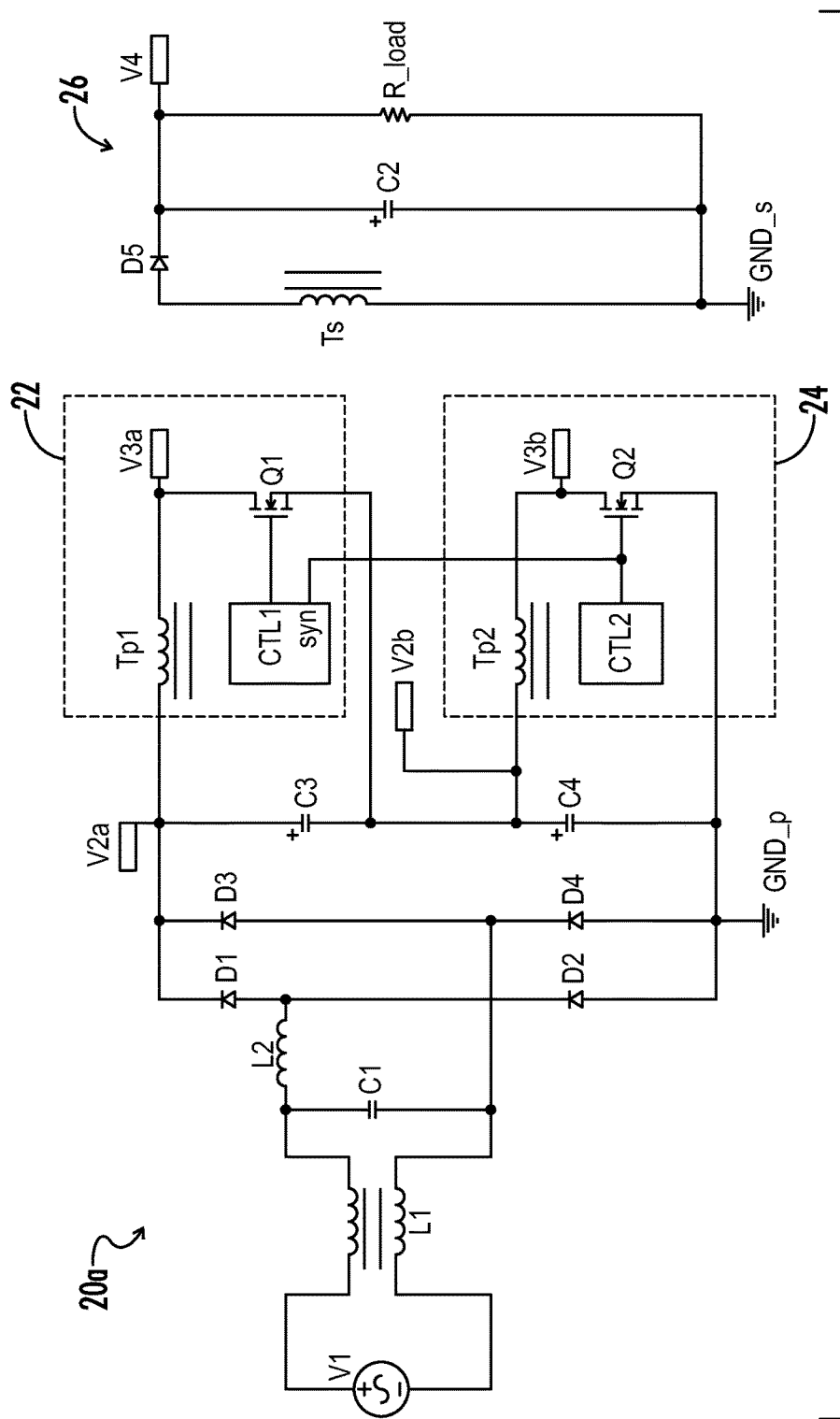
FIG. 2 is a circuit diagram representing one embodiment of a multi-stage flyback converter circuit according to the present invention.
Figure 3:
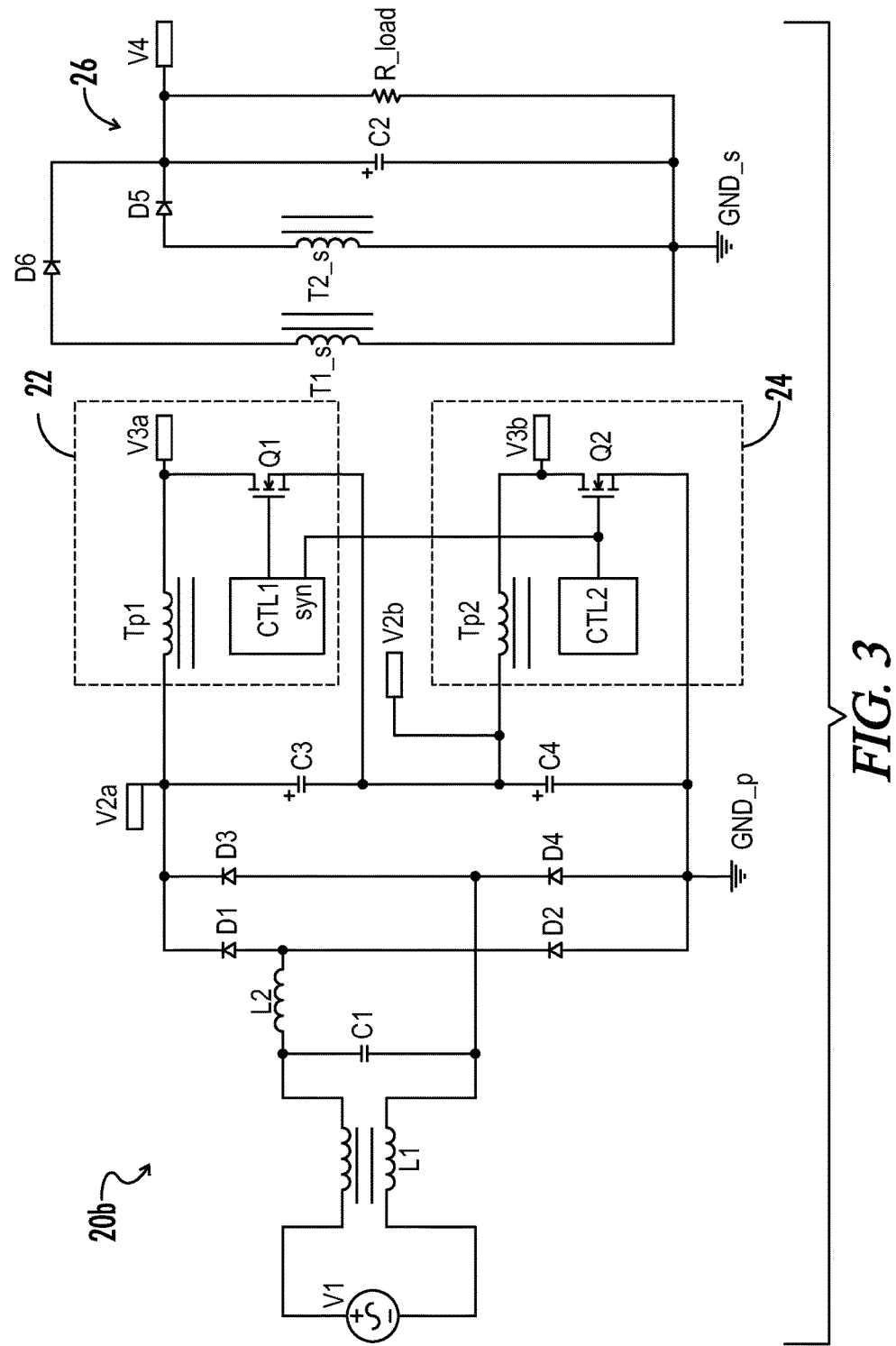
FIG. 3 is a circuit diagram representing another embodiment of a multi-stage flyback converter circuit according to the present invention.

Referring generally to FIGS. 2 and 3, various embodiments of a multi-stage flyback converter 20 may now be described. Where the various figures may describe embodiments sharing various common elements and features with other embodiments, similar elements and features are given the same reference numerals and redundant description thereof may be omitted below.

As represented in FIG. 2, an exemplary embodiment of a power converter 20a according to the present invention includes a first stage 22 and a second stage 24. The first stage 22 includes a first primary winding Tp1 of a flyback transformer coupled in series with a first switching element Q1 to function as a first independent flyback converter. The second stage 24 includes a second primary winding Tp2 of the flyback transformer coupled in series with a second switching element Q2 to function as a second independent flyback converter.

Controllers CTL1 and CTL2 may be provided to drive the first and second switching elements Q1, Q2, respectively. In an embodiment, controller CTL1 includes an input terminal SYN which is coupled to receive gate drive signals from controller CTL2 to the second switching element Q2, and is further configured to drive the first switching element Q1 based on the timing of the received gate drive signals, wherein the switching elements Q1, Q2 are driven synchronously, i.e., turned on and off at the same time.

An intermediate circuit is defined by capacitors C3 and C4 which are coupled in series across the DC input terminals and between the power source V1 and the first and second stages 22, 24. The first and second switching elements Q1, Q2 are each coupled to a midpoint of the intermediate circuit, or in other words a node between the capacitors C3, C4. Capacitors C3, C4 are used to buffer the energy from the output of the input rectifier diode bridge formed by diodes D1, D2, D3, and D4. When the main switches Q1, Q2 are synchronized as previously described, the first stage 22 and the second stage 24 will draw the same amount of power from the input source such that the voltage across each of capacitors C3, C4 will be equal and one-half of the input voltage.

The voltage stress across switching elements Q1 and Q2 can be calculated as represented below in equation (2):

$$V_{Q1} = V_{Q2} = \sqrt{2} \times \frac{V_{1\_rms}}{2} + N \times V_{out} + V_{leakage} \qquad (2)$$

If the turns ratio N of the flyback transformer, the output voltage Vout (V4) and the leakage voltage of the flyback transformer Vleakage each are presumed to remain the same with respect to Equation (1) above. Accordingly, VQ1=VQ2=503V so that a 600V MOSFET can be selected for each of the switching elements Q1 and Q2. A 600V MOSFET is comparatively inexpensive, readily available and very efficient because of its lower on-resistance compared to an 800V MOSFET).

Furthermore, because an input voltage for each stage 22, 24 is effectively one-half of the overall input V2a, the turns ratio N of the transformer may also be reduced, having an even further effect in minimizing the voltage stress on the switching components.

Referring next to FIG. 3, in another exemplary embodiment the power converter 20b may include a plurality of separate flyback transformers, rather than separate primary windings of a common transformer. A first stage 22 includes a primary winding T1_p from a first flyback transformer coupled in series with the first switching element Q1, and a second stage 24 includes a primary winding T2_p from a second flyback transformer coupled in series with the second switching element Q2.

Each flyback transformer has a secondary winding corresponding to a separate secondary stage, as opposed to the single secondary stage represented in FIG. 2. A secondary winding T1_s for the first flyback transformer is coupled in series with a first rectifying diode D6 to define a first secondary stage. A secondary winding T2_s for the second flyback transformer is coupled in series with a second rectifying diode D5 to define a second secondary stage in parallel with the first secondary stage. Each of the secondary stages is further coupled in parallel with the output capacitor C2.

Other than the structural distinctions in the topology as described above, the operating principles for each of the embodiments represented in FIGS. 2 and 3 are substantially the same.

In alternative embodiments, additional stages may be used to further reduce the voltage stress on associated main switching elements, to the extent that the inclusion of such additional components remains practical.

The previous detailed description has been provided for the purposes of illustration and description. Thus, although there have been described particular embodiments of a new and useful multi-stage flyback converter circuit for wide input voltage range applications, it is not intended that such references be construed as limitations upon the scope of any invention as described herein except as set forth in the following claims.

What is claimed is:

1. A DC-DC power converter circuit comprising:
   an intermediate circuit comprising first and second capacitors coupled in series across first and second DC input terminals and defining a midpoint;
   a flyback transformer having a first primary winding coupled on a first end to the first DC input terminal, a second primary winding coupled on a first end to the midpoint, and a secondary winding;
   a first switching element coupled between a second end of the first primary winding and the midpoint;
   a second switching element coupled between a second end of the second primary winding and the second DC input terminal;
   the secondary winding of the flyback transformer is configured for coupling to a DC load; and
   control circuitry is coupled to the first and second switching elements and effective to turn the first and second switching elements on and off synchronously, wherein a voltage across the first capacitor is substantially equal to a voltage across the second capacitor, further wherein a voltage stress across the first and second switching elements is substantially equal.

2. The circuit of claim 1, the first and second switching elements each comprising a MOSFET.

3. The circuit of claim 1, further comprising a rectifying diode and an output capacitor, the secondary winding of the flyback transformer coupled in series with the rectifying diode across the output capacitor.

4. A power converter circuit comprising:
   first and second input terminals effective to receive an AC source;
   a rectifier circuit effective to convert an AC input voltage from the AC source to a DC intermediate voltage across first and second DC terminals;
   an intermediate circuit comprising a plurality (N) of capacitors coupled in series across the DC terminals and defining one or more (N-1) intermediate nodes;
   a respective plurality (N) of primary converter stages, each primary converter stage coupled across one of the intermediate circuit capacitors and further comprising a switching element coupled in series with a primary winding of a respective flyback transformer of a plurality (N) of flyback transformers;
   a respective plurality (N) of secondary converter stages, each secondary converter stage coupled in parallel across first and second output terminals and further comprising a secondary winding of a respective one of the plurality (N) of flyback transformers; and
   control circuitry effective to turn the switching elements for each primary converter stage on and off synchronously, wherein voltages across each of the capacitors in the intermediate circuit are substantially equal, further wherein a voltage stress across the switching elements for each primary converter stage is substantially equal.

5. The circuit of claim 4, each of the switching elements for each primary converter stage comprising MOSFETs.

6. The circuit of claim 4, each secondary converter stage comprising a rectifying diode coupled in series with the respective secondary winding, the first and second output terminals comprising DC output terminals.

7. The circuit of claim 4, the rectifying circuit comprising a diode bridge.

* * * * *